United States Patent [19]
Calder et al.

[11] 3,994,597
[45] Nov. 30, 1976

[54] OPTICAL SIGHT WITH VARIABLE ILLUMINATION

[76] Inventors: William E. Calder, 606 Florence; Alan J. Winkelman, 30 Palm Ave.; William L. Robertson, 24 Palm Ave., all of Imperial Beach, Calif. 92032

[22] Filed: Dec. 26, 1974

[21] Appl. No.: 536,342

[52] U.S. Cl. .................................. 356/251; 350/10; 356/252
[51] Int. Cl.² ........................................ G02B 27/34
[58] Field of Search ............. 356/251, 252; 33/229, 33/233, 241, 251; 350/10

[56] References Cited
UNITED STATES PATENTS

| | | |
|---|---|---|
| 2,705,371 | 4/1955 | Hammond, Jr. ................. 356/252 X |
| 3,556,666 | 1/1971 | Lichtenstern ..................... 33/241 X |
| 3,645,635 | 2/1972 | Steck .................................. 356/252 |
| 3,672,782 | 6/1972 | Akin, Jr. ............................ 356/251 |
| 3,678,590 | 7/1972 | Hayward .............................. 33/241 |

*Primary Examiner*—John K. Corbin
*Assistant Examiner*—Matthew W. Koren
*Attorney, Agent, or Firm*—Brown & Martin

[57] ABSTRACT

An optical sight for use as a gun sight, surveying instrument, or the like, with means for projecting an illuminated reticle into the line of sight. The illumination is variable in color and intensity for maximum visibility against a variety of backgrounds, and means are provided for precise alignment, adjustment for elevation and windage and for levelling. In its basic form the sight has long eye relief, but is readily adaptable for use with telescopic attachments.

7 Claims, 17 Drawing Figures

OPTICAL SIGHT WITH VARIABLE ILLUMINATION

BACKGROUND OF THE INVENTION

Optical sights with aiming reticles have been made in many forms, with direct view or illuminated reticles, usually of the cross hair type, which are superimposed on a target. Some types have additional markings for range determination of known objects, and many include elevation adjustment for range compensation. The usual illumination arrangement is for use in low light conditions and the reticle may be difficult to see against some backgrounds, as is the case with the non-illuminated reticle used in daylight.

It would be a great advantage to have a sight with a reticle which is easily visible against any background under any lighting conditions.

SUMMARY OF THE INVENTION

The optical sight described herein contains a projector unit for projecting an illuminated reticle into the line of sight, which is a straight path through the instrument. The reticle provides a central spot which is apparently superimposed on the target at infinity, and may also include markings for range determination. Illumination for the reticle is from a group of light emitting diodes in the three primary colors, the light intensity being individually and collectively controllable to provide a light output of any desirable color and brightness. By varying the color, the spot may be made to stand out against any background, and the intensity can be varied for dim or bright lighting conditions without affecting the color purity of the spot.

A variable iris control is included which allows the spot size to be reduced to avoid obscuring a small target, the iris also opening up to expose the range markings when required. In one form, provision is made for adjusting the spot position to compensate for elevation and windage, when the device is used as a gun sight. For some purposes a level indication may be incorporated in the projector, to be visible in the light path adjacent the reticle spot. The basic sight, without any magnification, has long eye relief and can be held at some distance from the eye, as on a pistol at arm's length, or on a rifle at a safe distance from the eye to avoid injury from recoil. For long range use, telescopic eyepiece and objective elements are easily attached to the sight housing.

All controls are readily accessible for fast set up of the sight to suit specific conditions, and internal adjustment means are provided for precise optical alignment.

The primary object of this invention, therefore, is to provide a new and improved optical sight with variable illumination.

Another object of this invention is to provide an optical sight in which an illuminated reticle is projected into the line of sight, the illumination being variable in color and intensity.

Another object of this invention is to provide an optical sight adapted for telescopically aided or unaided use.

A further object of this invention is to provide an optical sight having means for indicating and compensating for range and other related factors.

Other objects and advantages will be apparent in the following detailed description, taken in conjunction with the accompanying drawings, in which.

DESCRIPTION OF THE PREFERRED EMBODIMENT

Figure 1:
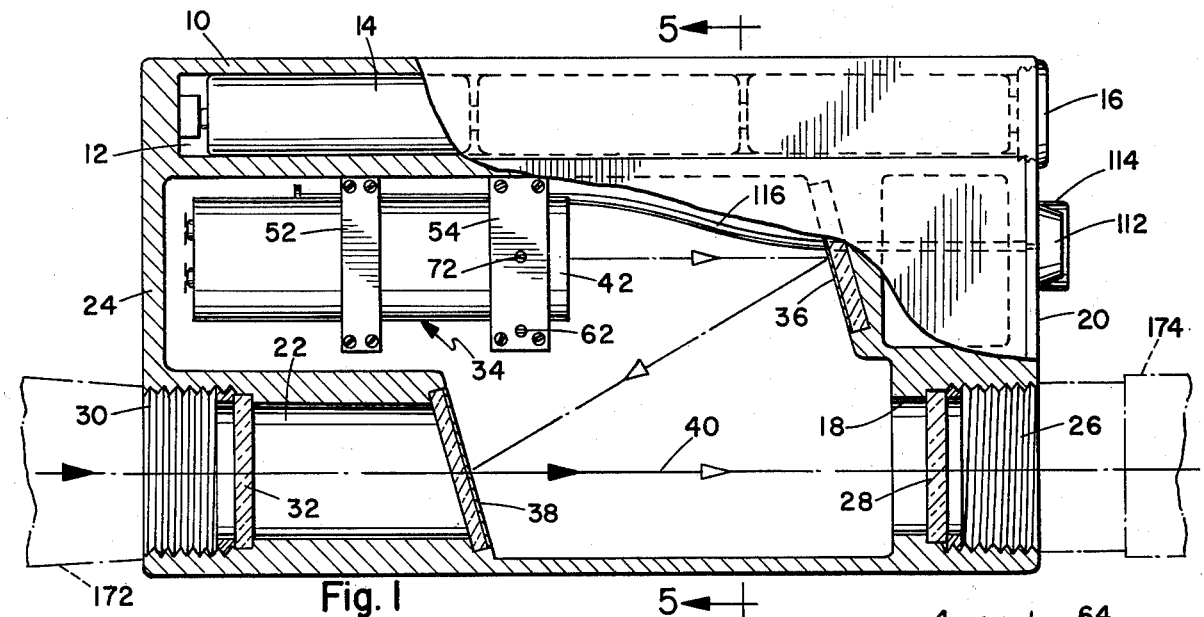
FIG. 1 is a side elevation view of the basic sight, with portions cut away.
Figure 2:
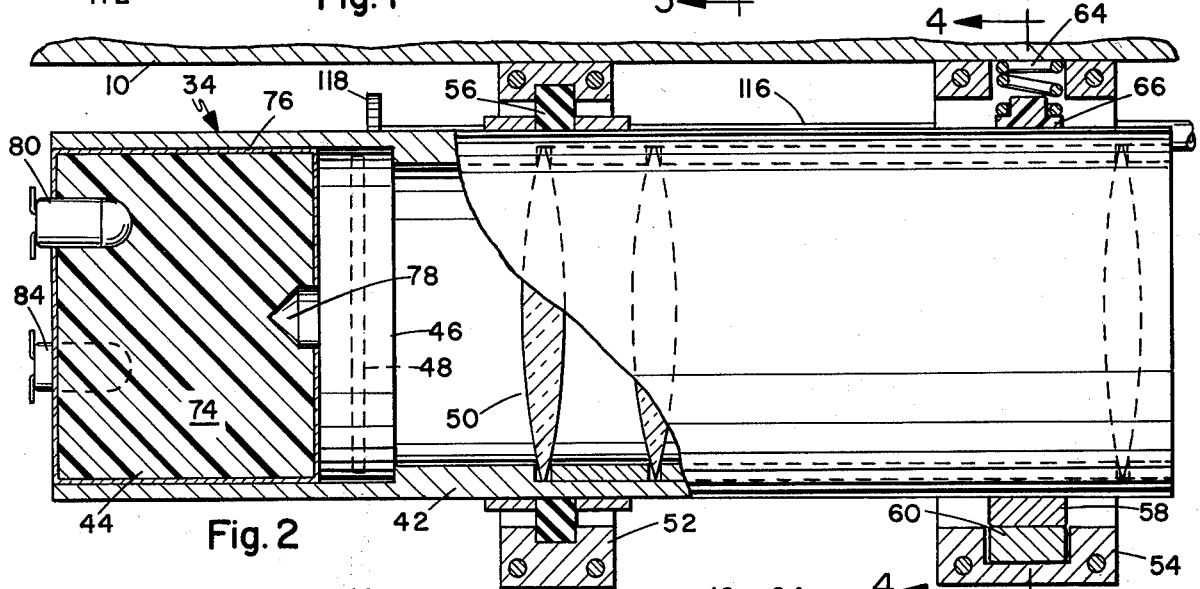
FIG. 2 is an enlarged side elevation view, partially cut away, of the projector unit.
Figures 3, 4:
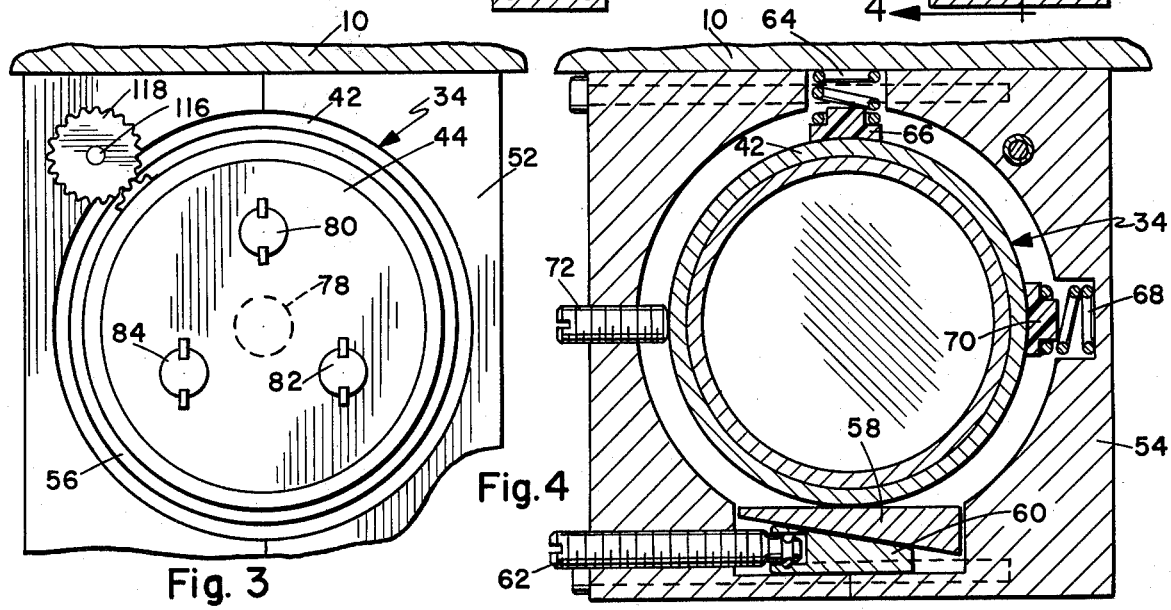
FIG. 3 is an end elevation view as taken from the left hand end of FIG. 2.
FIG. 4 is a sectional view taken on line 4—4 of FIG. 2.
Figure 5:
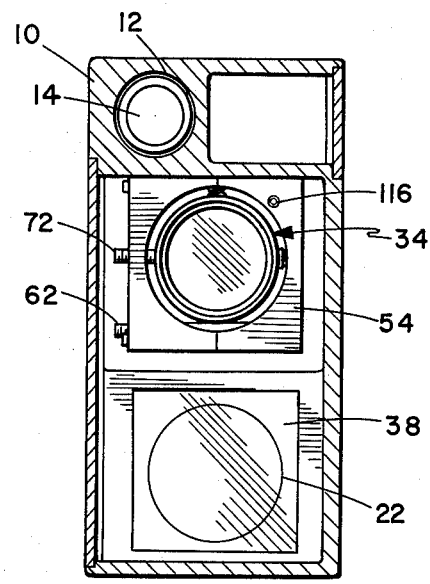
FIG. 5 is a sectional view taken on line 5—5 of FIG. 1.
Figure 6:
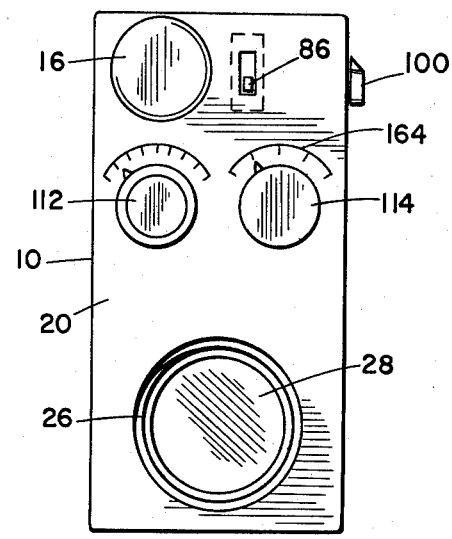
FIG. 6 is an end elevation view as taken from the right hand end of FIG. 1.
Figure 7:
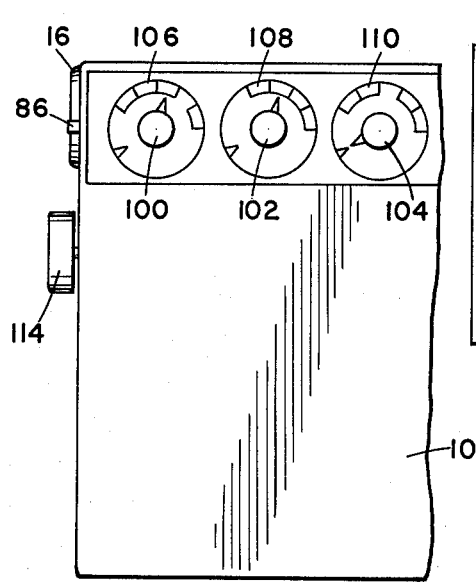
FIG. 7 is a side elevational view of a portion of the side opposite to that shown in FIG. 1.

The basic optical sight, illustrated in FIGS. 1 through 11, is completely contained in a substantially rectangular housing 10 of any suitable construction. In the upper portion of housing 10 is a cylindrical cavity 12 to hold batteries 14 for operating the sight, the batteries being retained by a cap 16. In the lower portion of the housing is an eyepiece opening 18 at rear end 20 and an objective opening 22 at the front end 24, the openings being axially aligned through the length of the housing. Eyepiece opening 18 has a threaded socket 26 and is closed by a transparent window 28. Objective opening 22 has a threaded socket 30 and is similarly closed by a transparent window 32, to seal the unit from ingress of foreign matter.

Inside the forward upper portion of housing 10 is a projector 34, mounted to project a reticle image to a front surface mirror 36 fixed in the upper rear portion of the housing. Mirror 36 is inclined to reflect the image forward and downward to a partially reflective beam splitter 38 fixed over the inner end of objective opening 22. Beam splitter 38 allows a target to be viewed along optical axis 40 and is inclined to reflect the reticle image through eyepiece opening 18 along the same optical axis. In FIG. 1, the target image path is indicated by solid arrows and the reticle image path by outlined arrows.

Projector 34 is contained in a cylindrical tube 42, at the front end of which is a light source 44. Immediately behind the light source is an iris unit 46 containing a multiple leaf diaphragm 48 of variable aperture, suitable diaphragm units being readily available. The rear portion of tube 42 contains a collimating lens system 50 for projecting an image at apparent infinity, the optical arrangement being well known.

Tube 42 is suspended from the housing 10 in a support frame 52 and an adjustment frame 54. In the support frame, the tube is held by a support ring 56 of hard rubber, plastic, or similar material, which provides firm support but has sufficient resiliency to allow angular adjustment in a very small range of motion. In the adjustment frame 54, the tube rests on a support wedge 58, which rides on an adjustment wedge 60, the adjustment wedge being moved by an elevation adjustment screw 62 projecting from the side of the frame. A spring 64 emerges a stud 66 on top of tube 42 to hold the tube down on the wedges and allow for vertical adjustment. Another spring 68 engages a stud 70 on the side of tube 42 to bias the tube against an azimuth adjustment screw 72, which also projects from the side of frame 54. By means of screws 62 and 72 the projector can be precisely aligned relative to the optical axis. The adjustable mounting for the projector is an example of a suitable arrangement and other such means may be used, depending on the range of adjustment required.

Light source 44 comprises a cylindrical block 74 of plastic, covered by a reflective coating 76. In the rear or inner end surface of block 74 is a conical cavity 78 with a slightly roughened surface which acts as a diffuser. When cavity 78 is illuminated from within block 74, the cavity becomes an illuminated spot which is the center of the reticle image. It is this spot which is projected into the optical path and appears to rest on the target as viewed.

To obtain the required control of color in the illumination, pure light sources are needed. This is accomplished by using LED's (light emitting diodes) which have a stable monochromatic light output at any intensity. Three LED's 80, 82 and 84 are recessed into the front or outer end of block 74, the reflective coating 76 causing the entire light output to be directed by multiple reflections to the only outlet, the cavity 78. The LED's are selected to emit in the three primary colors, red, green and blue, which can be mixed to provide any desired color and white light.

Figure 11:
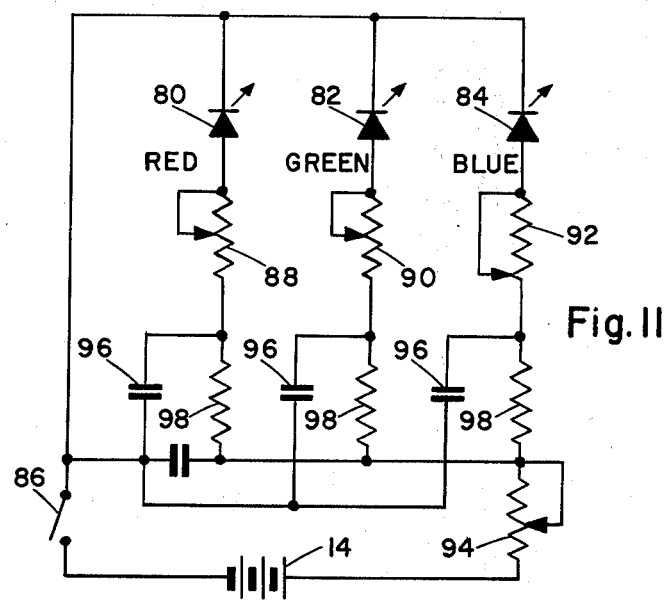
FIG. 11 is a schematic diagram of the illumination control system.

A simple wiring diagram for the device is illustrated in FIG. 11. Batteries 14 are connected through an ON/OFF switch 86 to one side of each of the LED's 80, 82 and 84, the other sides of the LED's being connected through potentiometers 88, 90 and 92, respectively, back to the batteries. An additional intensity control potentiometer 94 is installed in the common return connection to the batteries, to control overall intensity without affecting the individual LED settings. Each LED is also protected by a decoupling capacitor 96 and resistor 98, the circuitry being well known. Since the light output of an LED is not linear relative to the energization voltage, the potentiometers are preferably of the "tapered" type in inverse relation to the LED output curve, so that actual intensity is substantially linear on a convenient control. As illustrated, the potentiometers are provided with control knobs 100, 102 and 104, which are arranged along one side of housing 10 and read against color coded dials 106, 108 and 110, respectively, for selective setting of the LED's. Switch 86 and a knob 112 for intensity control potentiometer 94 are shown as being on the housing rear end 20, but any convenient control arrangement may be used.

Figure 8:
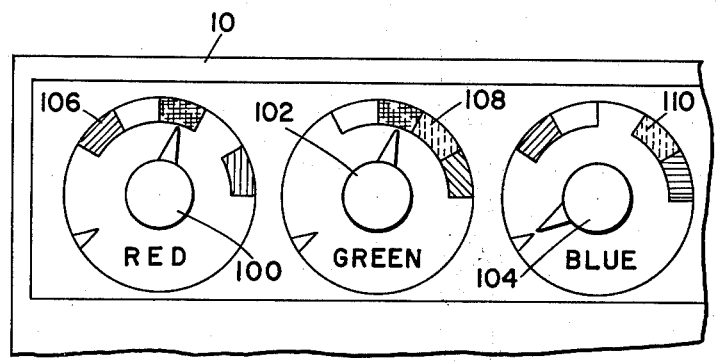
FIG. 8 is an enlarged view of the illumination controls shown in FIG. 7.

As illustrated by the control positions in FIGS. 8 and 11, the output of the red and green LED's is substantially equal, while the blue output is zero. The resultant light is yellow, which is the color of the projected reticle spot. For convenience the dials may be colored in sections for the resultant colors, so that one, two, or three knobs can be set to the desired color to obtain the proper mix which will be most visible against a particular background.

For simple control of the iris unit 46, a knob 114 is mounted on the housing rear end 20 and is connected by a flexible drive 116 to a gear 118, which rotates the diaphragm control. Other suitable means may be used, depending on the type of iris structure used.

Figure 9:
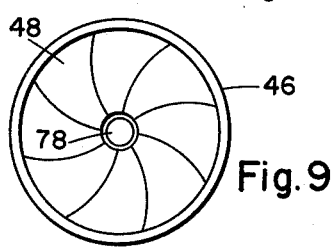
FIG. 9 is a view of the iris diaphragm exposing the entire illuminated spot.
Figure 10:
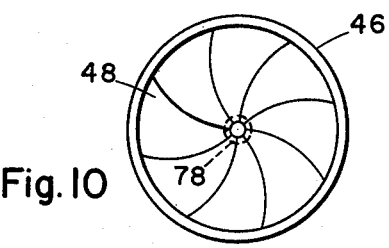
FIG. 10 is a view of the iris closed to reduce the spot size.

In FIG. 9 the diaphragm 48 is shown as being opened sufficiently to expose the entire cavity 78, so that the projected spot is at its maximum size. Under certain conditions it may be found that the spot will obscure a small target. In this event the diaphragm may be closed, as in FIG. 10, to reduce the effective size of the spot as it is projected. Only the back lighted image of the spot appears in the line of sight, the diaphragm not being visible.

A modified form of the sight is illustrated in FIGS. 12 through 15. In this configuration the projector and its mounting and the eyepiece and objective openings are as described above and are correspondingly numbered. The modifications are in the internal configuration of the housing 120 to accommodate the adjustable reflective elements. The various controls for the light source and iris are omitted for simplicity, but may be installed as described, or in any other convenient arrangement.

In the housing 120 is a mirror 122 positioned to reflect the image from projector 34 to a beam splitter 124 in the line of sight, similar to the arrangement described above. However, mirror 122 is secured to a base plate 126 which is pivotally mounted in the housing on a pin 128. The axis of pin 128 is vertical and intersects the reflective face of mirror 122 at the projection axis of projector 34. On the rear edge of base plate 126 is a gear sector 130 with its radius on the axis of pin 128, the gear sector being engaged by a pinion 132 on a shaft 134. The pinion shaft extends through the rear of housing 120 and is provided with a knob 136.

Beam splitter 124 is mounted on a platform 138, which is slidable in guides 140 to move parallel to optical axis 40. On the underside of platform 138 is a toothed rack 142, which is engaged by a pinion 144 on a shaft 146, the shaft extending from one side of the housing and having a knob 148.

Adjustment of knob 136 swings mirror 122 from side to side and deflects the projected reticle image laterally, to give the effect of correction for windage. By adjusting knob 148, the beam splitter 124 is moved along the optical axis 40 and can be made to intercept the projected image beam above or below the optical axis, giving correction for elevation or range.

As a further aid to accuracy, a bubble level 150 is mounted in the projector 34 just below the axis. The level is illuminated by a fiber optic rod 152 having a pick-up end 154 embedded in light source block 74. A shield 156 encloses the level except for the small central area in which the bubble 158 appears when the sight is held level. The bubble is thus illuminated in the same color as the reticle and appears in the projected image below the spot when the sight is level.

Figures 12, 13, 14, 15, 16, 17:
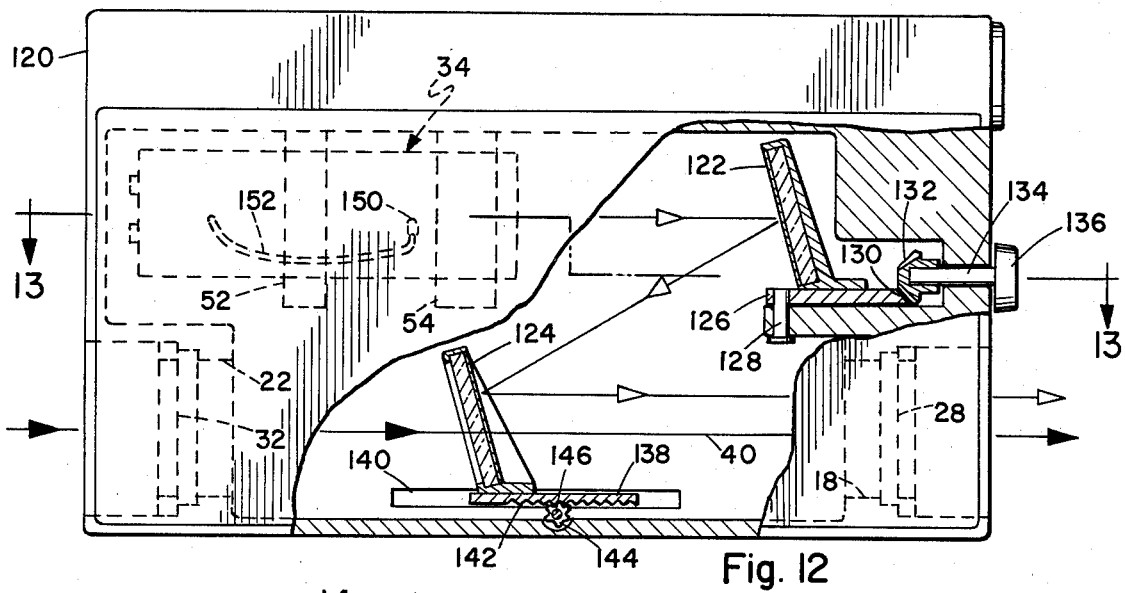
FIG. 12 is a side elevation view, partially cut away, of a modified form of the sight.
FIG. 13 is a sectional view taken on line 13—13 of FIG. 12.
FIG. 14 is an enlarged sectional view taken on line 14—14 of FIG. 13.
FIG. 15 is a view of the iris diaphragm partially exposing range markings on the reticle.
FIG. 16 illustrates the sight in use on a pistol.
FIG. 17 illustrates the sight in use on a rifle with telescopic attachments.

Rangefinding capability may be incorporated in the sight by applying suitable range markings 160 to the light source, as in FIG. 15. The markings may be applied in any suitable manner and increments to be back lighted by the variable color light source, so that they appear as part of the projected image around the spot 162. When sighting, the iris is adjusted until the projected back lighted area frames a target of known size. The range can then be read from the markings. For added convenience, the iris adjustment knob 114 may be provided with a scale 164, as in FIG. 6, which corresponds to the range markings on the reticle. This is particularly useful when the sight is used without optical aid at long eye relief and the internal markings may be too small to read clearly.

The long eye relief of the sight makes it suitable for use on a pistol 166, as in FIG. 16, or on an archery bow, with the sight held at arm's length away from the eye position 168. The view is directly through the windows 28 and 32, with the reticle image apparently resting on the target. If optical aid is needed, as when the sight is used on a rifle 170, an objective unit 172 is screwed into threaded socket 30 and a compatible eyepiece 174 is screwed into threaded socket 26. The objective and eyepiece may be of any suitable type to provide a telescope of the required power. With optical aid the sight is also adaptable for use as a surveying or alignment instrument, and various reticle configurations may be used to suit specific uses. The variable color and intensity of illumination makes the reticle image stand out against any background.

Having described our invention, we claim:

1. An optical sight, comprising:
   a housing having an eyepiece opening and an objective opening in axial alignment therethrough;
   a projector mounted in said housing, the projector having a reticle and a light source, with means for projecting an image of the reticle at apparent infinity;
   reflecting means in said housing positioned to reflect an image of said reticle into the optical path between said eyepiece and objective openings;
   said light source including a plurality of light emitting elements each having a light output of a distinct color different from the others;
   said light source having means for combining the outputs of said light emitting elements to illuminate said reticle;
   and illumination control means for varying the output intensity of said light emitting elements selectively.

2. An optical sight according to claim 1, wherein said illumination control includes means for varying the total intensity of the combined outputs of the light emitting elements.

3. An optical sight according to claim 1, wherein said light source includes a block of transparent material having a reflective outer coating, said reticle being at one end of said block and said light emitting elements being inset in spaced relation in the other end of the block.

4. An optical sight according to claim 3, wherein said means for combining comprises a translucent cavity in said one end of the block.

5. An optical sight according to claim 4, wherein said reflective coating covers the entire outer surface of the block except for said cavity and reticle.

6. An optical sight according to claim 4, wherein said light emitting elements are light emitting diodes having light outputs of primary colors.

7. An optical sight according to claim 4, and including an iris diaphragm mounted adjacent said reticle, and control means for varying the opening of the diaphragm from a minimum size smaller than the size of said cavity to a maximum size larger than the full reticle.

* * * * *